US009164905B2

(12) United States Patent
Inoue

(10) Patent No.: US 9,164,905 B2
(45) Date of Patent: Oct. 20, 2015

(54) SEMICONDUCTOR INTEGRATED CIRCUIT DEVICE, METHOD OF CONTROLLING SEMICONDUCTOR INTEGRATED CIRCUIT DEVICE, AND CACHE DEVICE

(75) Inventor: Hiroaki Inoue, Tokyo (JP)

(73) Assignee: NEC CORPORATION, Tokyo (JP)

( * ) Notice: Subject to any disclaimer, the term of this patent is extended or adjusted under 35 U.S.C. 154(b) by 771 days.

(21) Appl. No.: 13/393,814

(22) PCT Filed: Aug. 18, 2010

(86) PCT No.: PCT/JP2010/005096
§ 371 (c)(1),
(2), (4) Date: Mar. 1, 2012

(87) PCT Pub. No.: WO2011/027510
PCT Pub. Date: Mar. 10, 2011

(65) Prior Publication Data
US 2012/0166721 A1  Jun. 28, 2012

(30) Foreign Application Priority Data

Sep. 2, 2009  (JP) .................. 2009-203081

(51) Int. Cl.
G06F 12/00    (2006.01)
G06F 12/08    (2006.01)
(52) U.S. Cl.
CPC .... *G06F 12/0802* (2013.01); *G06F 2212/1028* (2013.01); *Y02B 60/1225* (2013.01)
(58) Field of Classification Search
CPC .. G11C 7/1006; G11C 7/1018; G06F 3/0601; G06F 12/0893
USPC ........................................ 711/104
See application file for complete search history.

(56) References Cited

U.S. PATENT DOCUMENTS 5,870,616 A   2/1999  Loper et al.
6,609,174 B1  8/2003  Naji
(Continued)

FOREIGN PATENT DOCUMENTS

JP   10-124202 A    5/1998
JP   2001-175641 A  6/2001
(Continued)

OTHER PUBLICATIONS

Japanese Office Action dated Oct. 8, 2013, with partial English translation.
(Continued)

Primary Examiner — Charles Rones
Assistant Examiner — Nanci Wong
(74) Attorney, Agent, or Firm — McGinn IP Law Group, PLLC.

(57) ABSTRACT

There are provided a semiconductor integrated circuit device, a method of controlling a semiconductor integrated circuit device, and a cache device capable of efficiently implementing power saving, wherein the cache device includes a low-voltage operation enabling cache (200), and a small-area cache (300) having a type different from that of the cache (200), the cache (200) and the cache (300) being independently supplied with source voltage; the cache (200) being operable at a voltage lower than the lower limit voltage at which the cache (300) is operable; a cache control unit (400) operating switchable controls between a first mode allowing only the cache (200) to operate, and a second mode allowing the cache (200) or the cache (300) to operate; and the cache (200) in the first mode operating to supply a voltage below the lower limit voltage at which the cache (300) is operable, while interrupting power supply to the cache (300).

19 Claims, 11 Drawing Sheets

(56) References Cited

U.S. PATENT DOCUMENTS

| | | | |
|---|---|---|---|
| 2002/0083280 A1* | 6/2002 | Naitoh et al. | 711/158 |
| 2003/0101362 A1* | 5/2003 | Dia | 713/300 |
| 2005/0044429 A1* | 2/2005 | Gaskins et al. | 713/300 |
| 2006/0064538 A1 | 3/2006 | Aizawa | |
| 2007/0187786 A1* | 8/2007 | Haratani | 257/421 |
| 2008/0037355 A1 | 2/2008 | Hirabayashi | |
| 2008/0222359 A1* | 9/2008 | Ninomiya et al. | 711/122 |
| 2009/0138658 A1* | 5/2009 | Dreslinski et al. | 711/118 |
| 2010/0185833 A1 | 7/2010 | Saito et al. | |
| 2011/0093726 A1* | 4/2011 | Worthington et al. | 713/320 |

FOREIGN PATENT DOCUMENTS

| | | |
|---|---|---|
| JP | 2006-092169 A | 4/2006 |
| JP | 2008-047190 A | 2/2008 |
| JP | 2008-293060 | 12/2008 |
| WO | WO03/042837 A1 | 5/2003 |
| WO | WO2008/152790 A1 | 12/2008 |

OTHER PUBLICATIONS

International Search Report in PCT/JP2010/005096 dated Nov. 30, 2010 (English Translation Thereof).

* cited by examiner

SEMICONDUCTOR INTEGRATED CIRCUIT DEVICE, METHOD OF CONTROLLING SEMICONDUCTOR INTEGRATED CIRCUIT DEVICE, AND CACHE DEVICE

TECHNICAL FIELD

The present invention relates to a semiconductor integrated circuit device, a method of controlling a semiconductor integrated circuit device, and a cache device, in particular to a semiconductor integrated circuit device having a cache, a method of controlling such semiconductor integrated circuit device, and a cache device.

BACKGROUND ART

With the recent increasing trend of power consumption by processor, the power consumption has been suppressed generally by lowering the source voltage. It has been known that lowering of the voltage is feasible for the logic section of the processor (0.3 V, for example), but difficult for the memory section such as cache (0.7 V, for example). Accordingly, the cache which stores commands and data has been understood as a bottleneck in achieving the low power consumption.

An exemplary system for reducing power consumption in an electronic circuit is described in Patent Document 1 (Japanese Laid-Open Patent Publication No. H10-124202). In the system described in Patent Document 1 illustrated in FIG. 11, a cache 50 designed to lower the power consumption has two small-area caches 52, 53 typically composed of memory elements such as SRAM (Static Random Access Memory), and a cache control unit 40 for controlling the cache. An essential feature of this technique resides in achieving the low power consumption, by interrupting power supply to the small-area cache 53. In other words, the low power consumption is implemented by reducing the area used for the operation.

On the other hand, in a semiconductor device described in Patent Document 2 (Japanese Laid-Open Patent Publication No. 2008-47190), a cache memory in a chip is configured by L1 cache SRAMs each having a relatively small capacity, and L2 cache SRAMs each having a relatively large capacity, the power consumption of which is suppressed by appropriately switching between the L1 and L2 cache SRAMs while controlling the increase of the size of the chip.

RELATED DOCUMENT

Patent Document

[Patent Document 1] Japanese Laid-Open Patent Publication No. H10-124202
[Patent Document 2] Japanese Laid-Open Patent Publication No. 2008-47190

DISCLOSURE OF THE INVENTION

The above-described methods, aimed at suppressing the power consumption by appropriately switching between two caches of the same kind so as to reduce the area used for operation, are not able to lower the source voltage per se to be supplied to the caches, only to suppress the power consumption to limited degrees, and are therefore incapable of enjoying benefits of low power consumption through lowering of the voltage.

It is therefore an object of the present invention to provide a semiconductor integrated circuit device, a method of controlling a semiconductor integrated circuit device, and a cache device, capable of solving the above-described problem of limitative suppression of power consumption.

According to the present invention, there is provided a semiconductor integrated circuit device which includes:
a high-speed storage unit which includes a first storage device, and a second storage device having a type different from that of the first storage device;
a control unit which controls the first storage device and the second storage device; and
a power supply unit which supplies source voltage independently to the first storage device and the second storage device,
the first storage device being operable at a voltage below the lower limit voltage at which the second storage device is operable,
the control unit operating switchable controls between a first mode allowing only the first storage device of the high-speed storage unit to operate, and a second mode allowing the first storage device or the second storage device of the high-speed storage unit to operate, and
the power supply unit, in the first mode, operating to supply a voltage below the lower limit voltage at which the second storage device of the high-speed storage unit is operable, to the first storage device of the high-speed storage unit, while interrupting power supply to the second storage device of the high-speed storage unit.

According to the present invention, there is provided a method of controlling a semiconductor integrated circuit device, wherein the semiconductor integrated circuit device includes a cache which includes a first storage device, and a second storage device having a type different from that of the first storage device, in which the first storage device is operable at a voltage below the lower limit voltage at which the second storage device is operable, wherein
the method comprising:
supplying source voltage independently to the first storage device and the second storage device;
operating switchable controls between a first mode allowing only the first storage device of the cache to operate, and a second mode allowing the first storage device or the second storage device of the cache to operate; and
operating, in the first mode, to supply a voltage below the lower limit voltage at which the second storage device of the cache is operable, to the first storage device of the cache, while interrupting power supply to the second storage device of the cache.

According to the present invention, there is provided a cache device which includes:
a first storage unit;
a second storage unit having a type different from that of the first storage unit; and
a control unit which controls the first storage unit and the second storage unit, wherein
the first storage unit and the second storage unit are independently supplied with source voltage,
the first storage unit being operable at a voltage lower than the lower limit voltage at which the second storage unit is operable, and
the control unit operating switchable controls between a first mode allowing only the first storage unit to operate, and a second mode allowing the first storage unit or the second storage unit to operate,
the first storage unit, in the first mode, being supplied with a voltage below the lower limit voltage at which the second storage unit is operable, while interrupting power supply to the second storage unit.

Note that all arbitrary combinations of the above-described constituents, and all conversions of expression of the present invention, made among method, device, system, recording medium and computer program, are valid as the exemplary embodiments of the present invention.

Note also that the various constituents of the present invention are not necessarily entities independent from each other, so that a plurality of constituents may configure a single component, a single constituent may be configured by a plurality of components, a certain constituent may be a part of other constituent, and a part of a certain constituent may be shared with a part of other constituent.

While the method and the computer program of the present invention are expressed by sequentially enumerating a plurality of procedures, the order of enumeration does not restrict the order of execution of such plurality of procedures. Accordingly, when the method and computer program of the present invention are implemented, the order of implementation of the plurality of procedures may be modified, without adversely affecting the substance of the invention.

The plurality of procedures of the method and the computer program of the present invention are not always necessarily executed over different durations. Accordingly, one procedure may arise in the process of execution of other procedure, and, a part of, or the entire portion of, an execution timing of a certain procedure may overlap with an execution timing of other procedure.

According to the present invention, a semiconductor integrated circuit device, a method of controlling a semiconductor integrated circuit device and a cache device, all of which being capable of efficiently implementing low power consumption, are provided.

BRIEF DESCRIPTION OF THE DRAWINGS

The above and other objects, features and advantages of the present invention will be more apparent from the following description of certain preferred exemplary embodiments taken in conjunction with the accompanying drawings listed below.

BEST MODE FOR CARRYING OUT THE INVENTION

Figure 1:
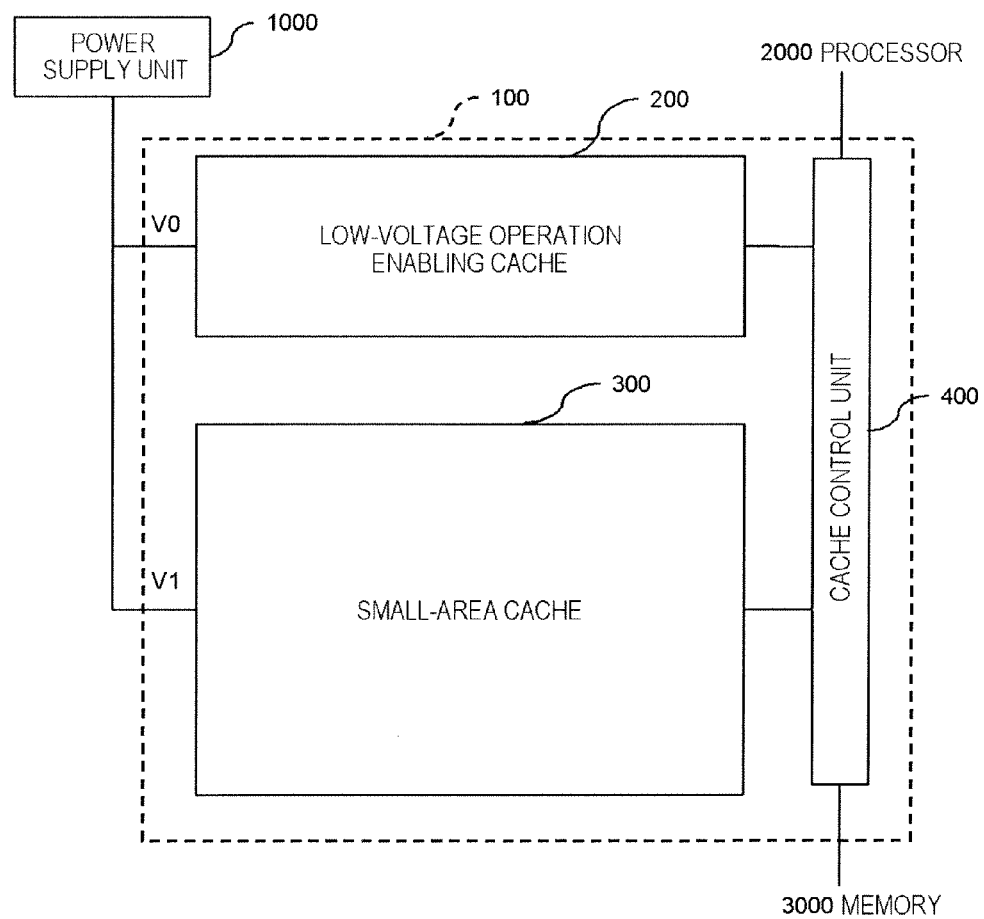
FIG. 1 is a functional block diagram illustrating a configuration of a cache of a semiconductor integrated circuit device according to an exemplary embodiment of the present invention.

Exemplary embodiments of the present invention will be explained below, referring to the attached drawings. Note that all similar constituents in all drawings are given similar reference numerals or symbols, so as to avoid repetitive explanation.

FIG. 1 is a functional block diagram illustrating a configuration of a cache of a semiconductor integrated circuit device according to an exemplary embodiment of the present invention.

The semiconductor integrated circuit device of this exemplary embodiment includes a high-speed storage unit (cache 100) which includes a first storage device (low-voltage operation enabling cache 200), and a second storage device (small-area cache 300) having a type different from that of the low-voltage operation enabling cache 200, a control unit (cache control unit 400) which controls the low-voltage operation enabling cache 200 and the small-area cache 300, and a power supply unit 1000 which supplies source voltage independently to the low-voltage operation enabling cache 200 and the small-area cache 300. The low-voltage operation enabling cache 200 is operable at a voltage below the lower limit voltage at which the small-area cache 300 is operable. The cache control unit 400 operates switchable controls between a first mode allowing only the low-voltage operation enabling cache 200 of the cache 100 to operate, and a second mode allowing the low-voltage operation enabling cache 200 or the small-area cache 300 of the cache 100 to operate. The power supply unit 1000, in the first mode, operates to supply a voltage, below the lower limit voltage at which the small-area cache 300 of the cache 100 is operable, to the low-voltage operation enabling cache 200 of the cache 100, while interrupting power supply to the small-area cache 300 of the cache 100.

According to this configuration, a cache characterized by low power consumption may be implemented, by allowing the low-voltage operation enabling cache 200 to operate at a lower voltage than the small-area cache 300.

Figure 2:
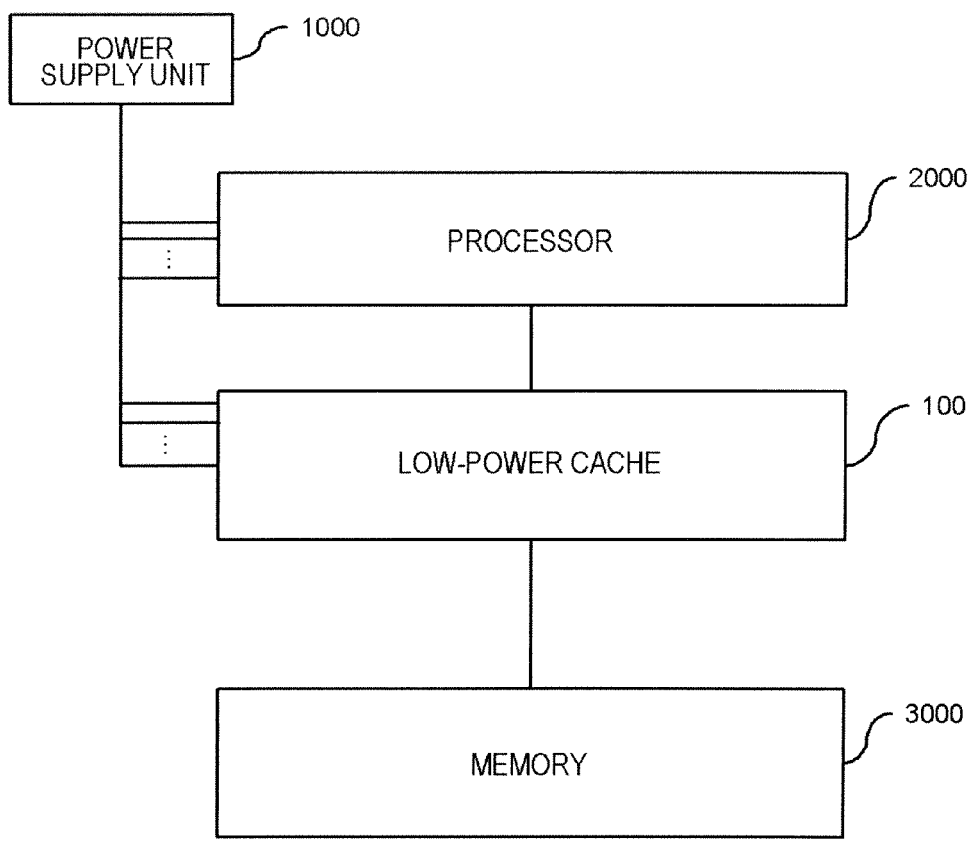
FIG. 2 is a block diagram illustrating a configuration of the semiconductor integrated circuit device according to the exemplary embodiment of the present invention.

FIG. 2 is a block diagram illustrating a configuration of the semiconductor integrated circuit device according to the exemplary embodiment of the present invention. As illustrated in the drawing, the semiconductor integrated circuit device includes a processor 2000, the cache 100 ("low-power cache 100" in the drawing), a memory 3000, and the power supply unit 1000. Description will now be given below, referring to FIG. 1 and FIG. 2. Note that configurations of portions not essential to the present invention will neither be described nor illustrated.

Each constituent of the semiconductor integrated circuit device may be implemented by an arbitrary combination of hardware and software of an arbitrary computer, mainly contributed by a CPU, a memory, a program loaded on the memory so as to implement the constituent illustrated in the drawing, a storage unit such as hard disk which stores the program, and an interface for network connection. Those skilled in the art may understand various modifications derived from the methods of implementation and relevant devices. The drawings explained below illustrate function-based blocks, rather than hardware-based configuration.

The processor 2000 herein is defined as a processing unit composed of logics. The processor 2000 may therefore be a processing unit such as accelerator, FPGA (Field Programmable Gate Array) or the like, without special limitation.

The cache 100 enables low-voltage operation, and is connected to the processor 2000 and the memory 3000. While the cache may generally be included in the processor 2000, the both herein are separately described in order to clarify the configuration. Functions are not affected if it is included in the processor 2000.

The cache device (cache 100) of this exemplary embodiment includes the first storage unit (low-voltage operation enabling cache 200), the second storage unit (small-area cache 300) having a type different from that of the low-voltage operation enabling cache 200, and the control unit (cache control unit 400) which controls the low-voltage operation enabling cache 200 and the small-area cache 300. The low-voltage operation enabling cache 200 and the small-area cache 300 are independently supplied with source voltage. The low-voltage operation enabling cache 200 is operable at a voltage lower than the lower limit voltage at which the small-area cache 300 is operable. The cache control unit 400 operating switchable controls between a first mode allowing only the low-voltage operation enabling cache 200 to operate, and a second mode allowing the low-voltage operation enabling cache 200 or the small-area cache 300 to operate. In the first mode, the low-voltage operation enabling cache 200 is supplied with a voltage below the lower limit voltage at which the small-area cache 300 is operable, while interrupting power supply to the small-area cache 300.

The memory 3000 in this exemplary embodiment is assumed as a main storage typically fabricated by DRAM (Dynamic Random Access Memory) or the like. The power supply unit 1000 supplies an independent source voltage to each of the processor 2000 and the cache 100.

As illustrated in FIG. 1, the cache 100 includes the cache control unit 400 which controls the cache 100, the low-voltage operation enabling cache 200 enabling the low-voltage operation, and the small-area cache 300. By the power supply unit 1000, the low-voltage operation enabling cache 200 is independently supplied with a voltage V0 (V), and the small-area cache 300 is supplied with a voltage V1 (V). In other words, the low-voltage operation enabling cache 200 and the small-area cache 300 are operable at independent levels of source voltage.

The low-voltage operation enabling cache 200 is composed by using memory elements, incorporated therein, which enable the low-voltage operations. It is only necessary to enable the low-voltage operation, and may be, for example, a circuit configured by a logic including a flip-flop, or a nonvolatile memory using a magnetism including an MRAM (Magnetoresistive Random Access Memory) or the like, without special limitation. While these sorts of memory element have been known to degrade the area efficiency when considered on the memory element alone, the cache as a whole will not suffer from a large overhead, because the cache is replaced with only a small portion of the small-area cache.

The small-area cache 300 is a kind of cache designed to minimize the occupational area using general transistors, and is generally understood that it is difficult to operate at low voltage.

Since performances of the application to be run, such as processing speed, picture quality in multi-media processing, and communication quality may be adversely affected depending on types of the cache to be employed, so that this exemplary embodiment may be designed to select the operation mode of the cache 100, depending on the application to be run on the processor 2000. Degradation in performance caused by the cache includes a slowdown in the processing speed, degradation of picture quality due to dropping frames in the multi-media processing, and communication error in the communication processing.

A more efficient power saving of the cache 100 may be achieved, by varying the portion of the cache to be used and the source voltage supplied thereto, depending on the application to be run on the processor 2000. Technique of switching per se is, however, not an essential issue of the present invention, and is not specifically limited. Any technique capable of switching, such as use of software such as OS, may be adoptable.

For the case of use of application, represented by SPEC95, which is relatively largely influenced in its performance degradation caused by the cache, the second mode is selected, and thereby the cache is configured by the low-voltage operation enabling cache 200 and the small-area cache 300. In this way, performances equivalent to those of the general cache can be achieved. It is also possible to further save the power, by lowering the source voltage of the low-voltage operation enabling cache 200, than the source voltage of the small-area cache 300. However, a possible case may be such as intentionally selecting a low-power-consumptive operation aiming at suppressing exhaustion of batteries, no matter how performances of the application may degrade. In this case, the first mode is selectable.

On the other hand, for the case of use of application, such as those for multi-media processing, which is relatively less influenced in its performance degradation caused by the cache, in other words, for the case of use of application about which the cache size is less affective to the performances, the first mode is selected, and thereby the cache is composed of only the low-voltage operation enabling cache 200, with the source voltage thereof set lower than the source voltage of the small-area cache 300. While the performances may slightly degrade due to reduction in the cache volume, performances per unit power can largely be improved by virtue of reduced power consumption through lowering in voltage.

The cache 100 may adopt various caching configurations including those based on association system such as direct-mapping, set associative and full associative; interchange system such as round-robin, LRU (Least Recently Used) and random; and write system such as write-through and write-back.

Also types of commands, data and information to be stored, and cache hierarchy expressed by level 1, level 2 and so on may be arbitrary.

The description hereinafter will be made on an exemplary case where the write-back system is adopted as a write system, and a write allocate system is adopted as an allocation system for lines.

Operations of the thus constructed semiconductor integrated circuit device of this exemplary embodiment will be explained below.

Figure 3:
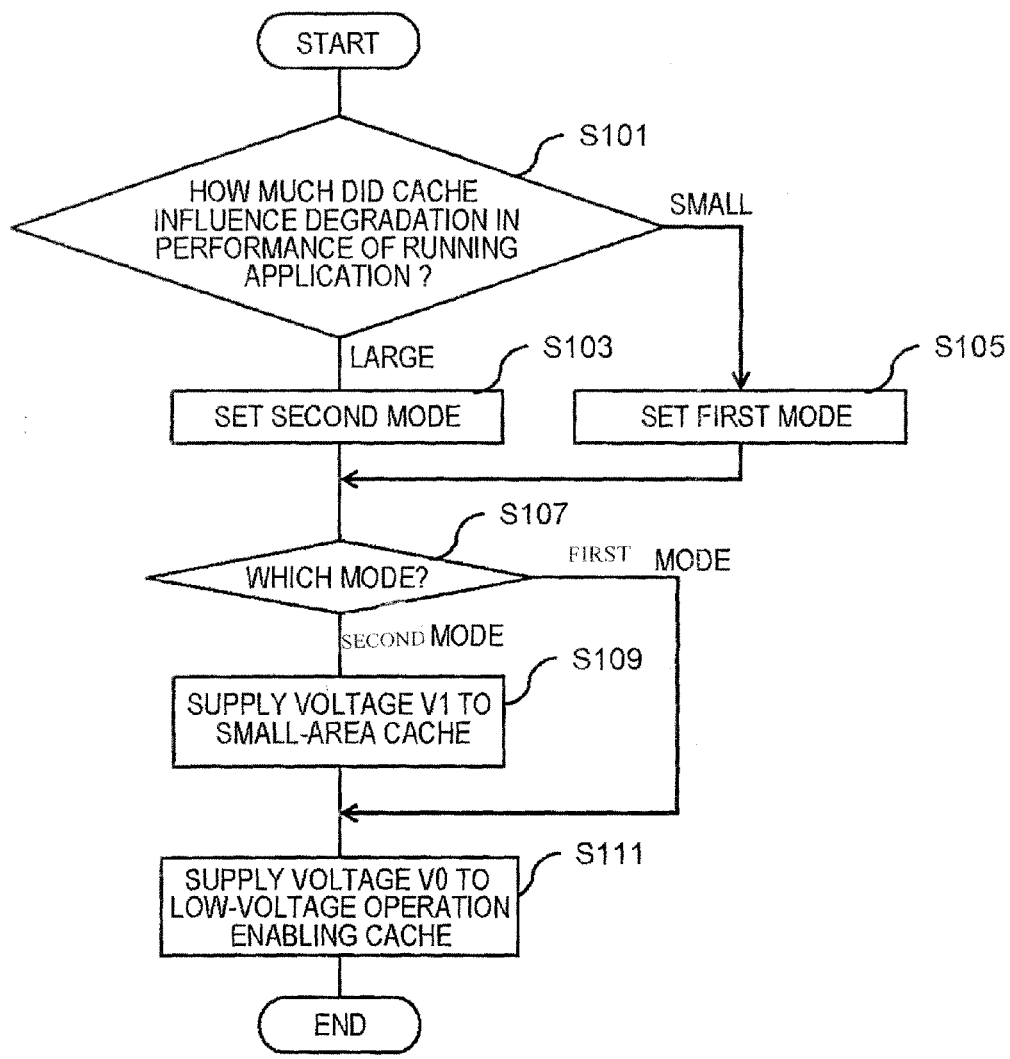
FIG. 3 is a flow chart illustrating exemplary operations of the semiconductor integrated circuit device of this exemplary embodiment.

FIG. 3 is a flow chart illustrating exemplary operations of the semiconductor integrated circuit device of this exemplary embodiment.

In a method of controlling the semiconductor integrated circuit device of this exemplary embodiment, the semiconductor integrated circuit device includes the cache 100 which includes low-voltage operation enabling cache 200, and the small-area cache 300 having a type different from that of the low-voltage operation enabling cache 200, wherein the low-voltage operation enabling cache 200 is operable at a voltage below the lower limit voltage at which the small-area cache 300 is operable. The method includes: supplying source voltage independently to the low-voltage operation enabling cache 200 and to the small-area cache 300; operating switchable controls between a first mode allowing only the low-voltage operation enabling cache 200 of the cache 100 to operate, and a second mode allowing the low-voltage operation enabling cache 200 or the small-area cache 300 of the cache 100 to operate; and operating, in the first mode, to supply a voltage below the lower limit voltage at which the small-area cache 300 of the cache 100 is operable, to the low-voltage operation enabling cache 200 of the cache 100, while interrupting power supply to the small-area cache 300 of the cache 100.

In this exemplary embodiment, depending on the running application, the first mode and the second mode are switched (the step S101). More specifically, when the application is largely affected by the cache in view of degrading the performance thereof ("LARGE" in the step S101), the second mode is set (the step S103). On the other hand, when the application is less affected by the cache in view of degrading the performance thereof (SMALL in the step S101), the first mode is set (the step S105).

According to the thus-set mode, the cache 100 operates as described below. In the second mode ("SECOND MODE" in the step S107), the source voltage is supplied by the power supply unit 1000 to both of the low-voltage operation enabling cache 200 and the small-area cache 300, so as to make the both operable. In this exemplary embodiment, the small-area cache 300 is supplied with the source voltage V1 (the step S109), and the low-voltage operation enabling cache 200 is supplied with the source voltage V0 (the step S111). The source voltage V0 supplied herein to the low-voltage operation enabling cache 200 may be lower than the source voltage V1 supplied to the small-area cache 300.

On the other hand, in the first mode ("FIRST MODE" in the step S107), the source voltage V0 is supplied by the power supply unit 1000 to the low-voltage operation enabling cache 200 (the step S111). In the first mode ("FIRST MODE" in the step S107), the step S109 is bypassed, so that the small-area cache 300 is not supplied with the source voltage. The source voltage V0 supplied herein to the low-voltage operation enabling cache 200 may be lower than the lower limit voltage of the small-area cache 300.

Operations of the cache 100 will now be explained mode-by-mode below, referring to FIG. 4 to FIG. 7.

FIG. 4 to FIG. 7 are drawings for explaining exemplary operations of the cache 100 of this exemplary embodiment. In the drawings, each symbol composed of the letter S and a numeral given beside each arrow represents the number of the step in which each operation takes place.

Figure 4:
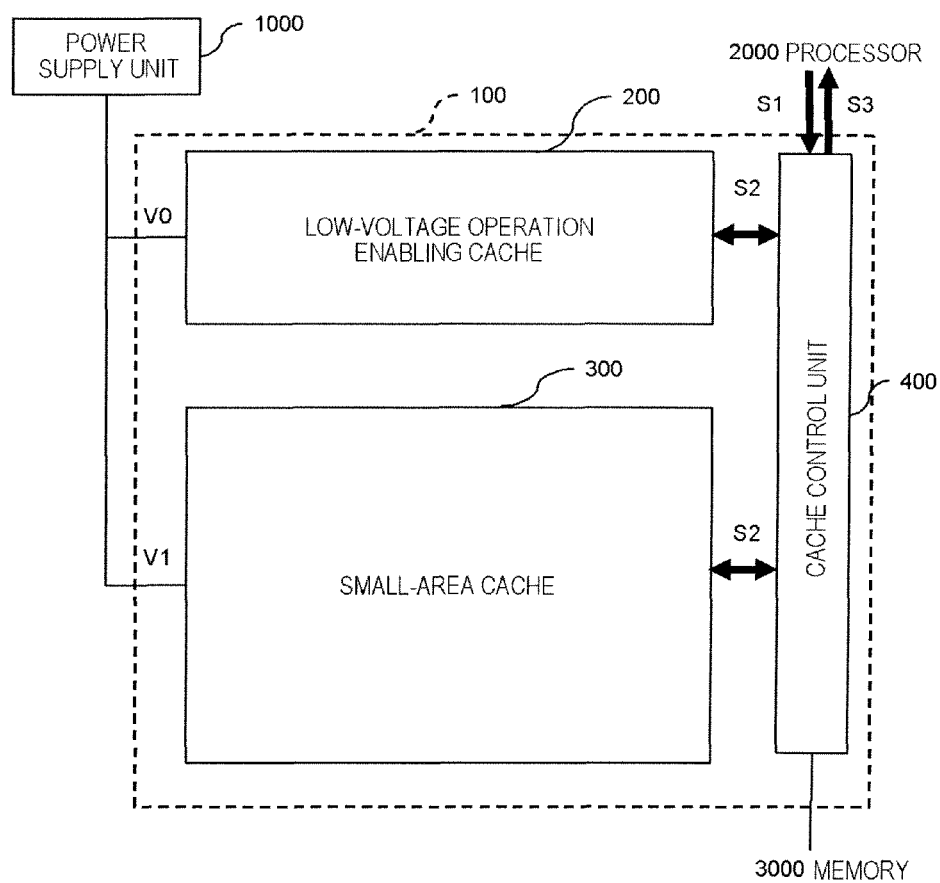
FIG. 4 is a drawing for explaining exemplary operations of a low-power cache of this exemplary embodiment.

The explanation begins with the exemplary case illustrated in FIG. 4, where an application, relatively largely affected by the cache in view of degrading the performance thereof, is allowed to run, thereby the second mode is selected, and data necessary for the processor 2000 is stored in the cache 100.

In the step S1, the processor 2000 issues a memory access request to the cache control unit 400. Next, in the step S2, the cache control unit 400 accesses the low-voltage operation enabling cache 200 and the small-area cache 300, and checks whether data which corresponds to the request is stored or not.

For example, the memory access request includes a read-out request for prompting reading of data out from the memory, and a write-in request for prompting writing of data into the memory. For the case of reading, the cache control unit 400 accepts data read from the memory, which is the cache 100 herein. For the case of writing, the cache control unit 400 updates data stored in the memory, which is the cache 100 herein. Then in the step S3, for the case of reading, the cache control unit 400 returns the thus-read data to the processor 2000.

Figure 5:
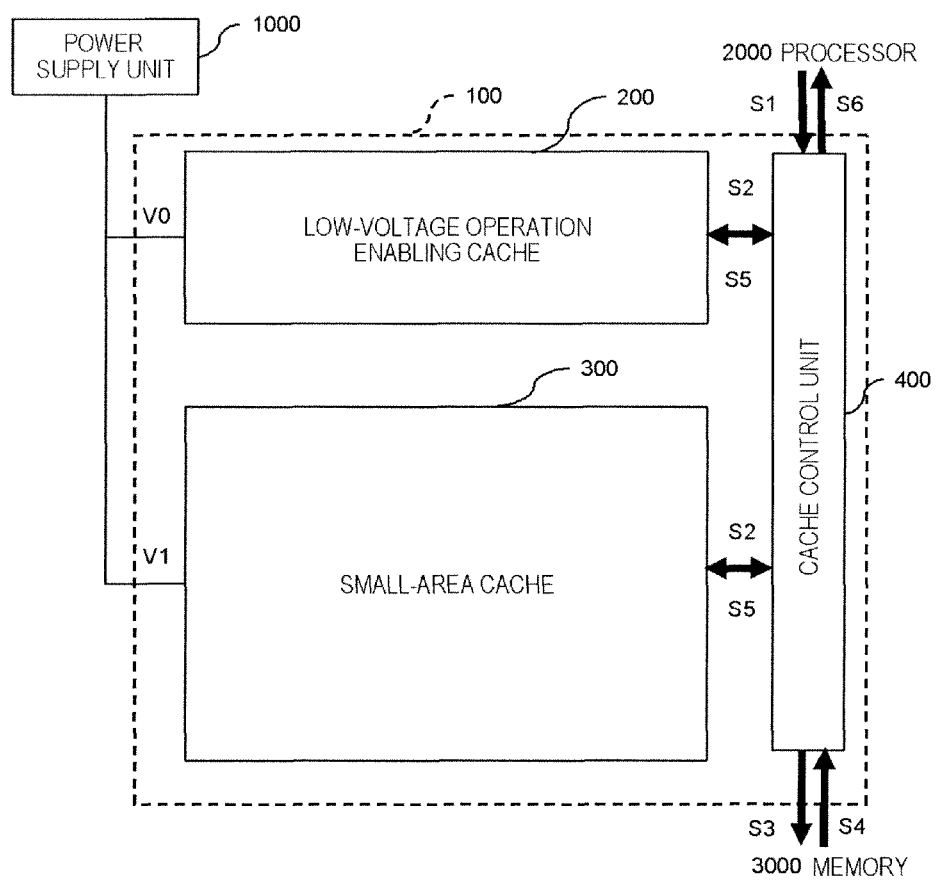
FIG. 5 is a drawing for explaining exemplary operations of a low-power cache of this exemplary embodiment.

The explanation in the next will deal with the exemplary case illustrated in FIG. 5, where an application, relatively largely affected by the cache in view of degrading the performance thereof, is allowed to run, thereby the second mode is selected, while data necessary for the processor 2000 is not stored in the cache 100.

In the step S1, the processor 2000 issues a memory access request to the cache control unit 400. In the step S2, the cache control unit 400 accesses the low-voltage operation enabling cache 200 and the small-area cache 300, and checks whether data which corresponds to the request is stored or not. In this case, the data is not stored.

Accordingly, in the step S3, the cache control unit 400 issues the request to the memory 3000. In the step S4, the cache control unit 400 receives the data from the memory 3000. In the step S5, the cache control unit 400 stores the data in either of the low-voltage operation enabling cache 200 or the small-area cache 300. How to select the cache as the destination of storage may conform to any of the conventionally-known methods of configuring the cache. In the process of writing, updating of the data precedes the storage. On the other hand, in the process of reading, in the step S6, the cache control unit 400 returns the data, read out from the memory 3000 and stored into the cache 100, to the processor 2000.

Figure 6:
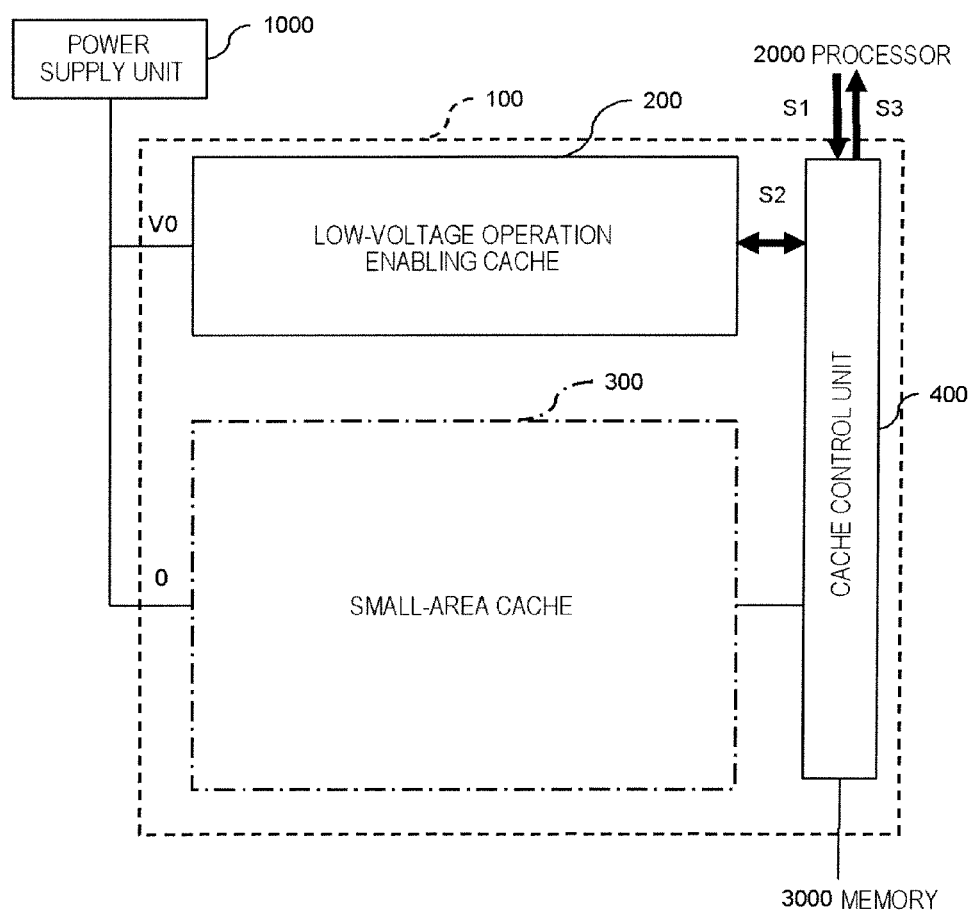
FIG. 6 is a drawing for explaining exemplary operations of a low-power cache of this exemplary embodiment.

The explanation in the next will deal with the exemplary case illustrated in FIG. 6, where an application, less affected by the cache in view of degrading the performance thereof, is allowed to run, thereby the first mode is selected, and data necessary for the processor 2000 is stored in the cache 100. The source voltage V0 of the low-voltage operation enabling cache 200 herein is assumed to be set lower than the lower limit voltage of the small-area cache 300.

In the step S1, the processor 2000 issues a memory access request to the cache control unit 400. Next, in the step S2, the cache control unit 400 checks whether data which corresponds to the request is stored in the low-voltage operation enabling cache 200 or not. In the process of reading, the data is accepted. In the process of writing, the data is updated. Then in the step S3, in the process of reading, the cache control unit 400 returns the stored data to the processor 2000.

Figure 7:
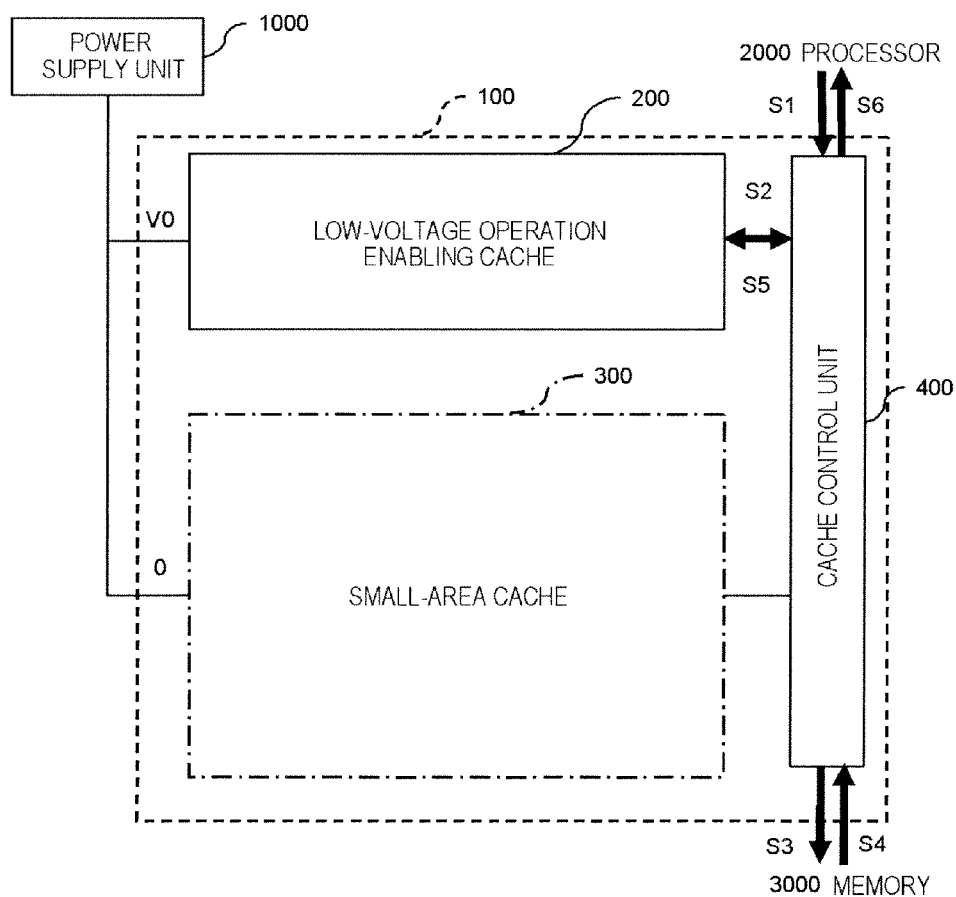
FIG. 7 is a drawing for explaining exemplary operations of a low-power cache of this exemplary embodiment.

The explanation in the next will deal with the exemplary case illustrated in FIG. 7, where an application, less affected by the cache in view of degrading the performance thereof, is allowed to run, thereby the first mode is selected, while data necessary for the processor 2000 is not stored in the cache 100.

The source voltage V0 of the low-voltage operation enabling cache 200 herein is assumed to be set lower than the lower limit voltage of the small-area cache 300. Since the operation herein is in the second mode, the power supply unit 1000 supplies the source voltage only to the low-voltage operation enabling cache 200, while leaving the small-area cache 300 unoperated.

In the step S1, the processor 2000 issues a memory access request to the cache control unit 400. Then in the step S2, the cache control unit 400 accesses the low-voltage operation enabling cache 200, and checks whether data which corresponds to the request is stored or not. In this case, the data is not stored.

Accordingly, in the step S3, the cache control unit 400 issues the request to the memory 3000. In the step S4, the cache control unit 400 then accepts the corresponding data from the memory 3000. In the step S5, the cache control unit 400 stores the data in the low-voltage operation enabling cache 200. In the process of writing, updating of the data precedes the storage. On the other hand, in the process of reading, in the step S6, the cache control unit 400 returns the data, read out from the memory 3000 and stored into low-voltage operation enabling cache 200, to the processor 2000.

Figure 8:
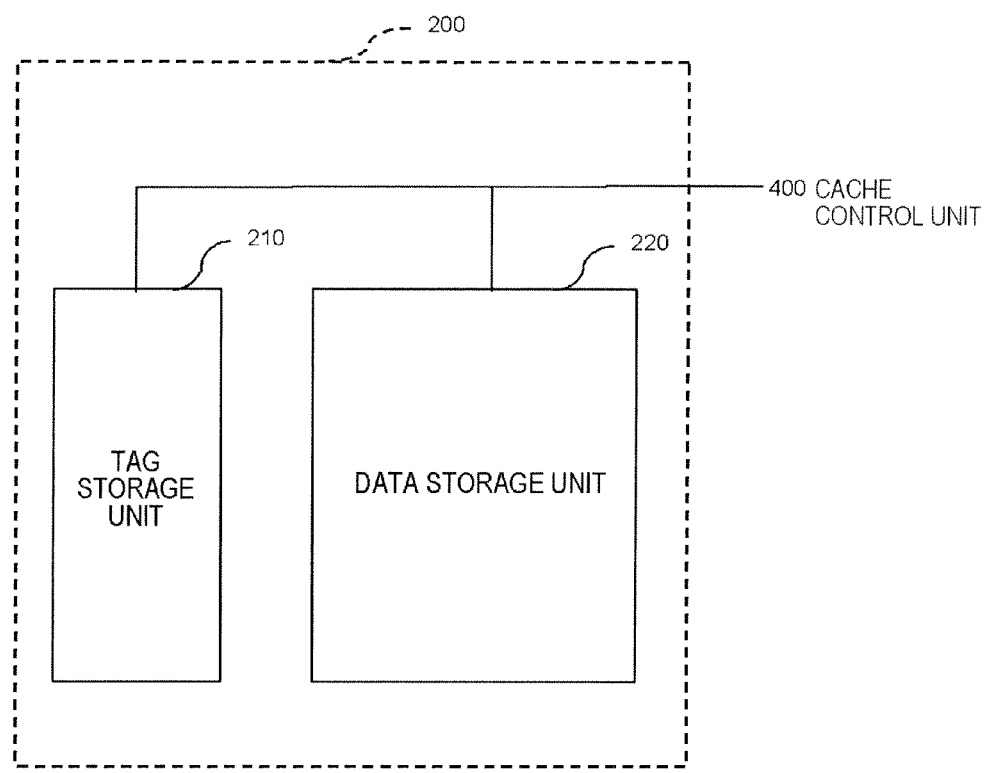
FIG. 8 is a block diagram illustrating an exemplary configuration of a low-voltage operation enabling cache of this exemplary embodiment.

FIG. 8 is a block diagram illustrating an exemplary configuration of the low-voltage operation enabling cache 200 of this exemplary embodiment. As illustrated in the drawing, the low-voltage operation enabling cache 200 includes memory elements, which are operable at low voltages, having a tag storage unit 210 and a data storage unit 220. The tag storage unit 210 and the data storage unit 220 are configured similarly to the small-area cache 300 or the general cache, and are designed to simply return the correspondent data upon requested by the cache control unit 400.

Figure 9:
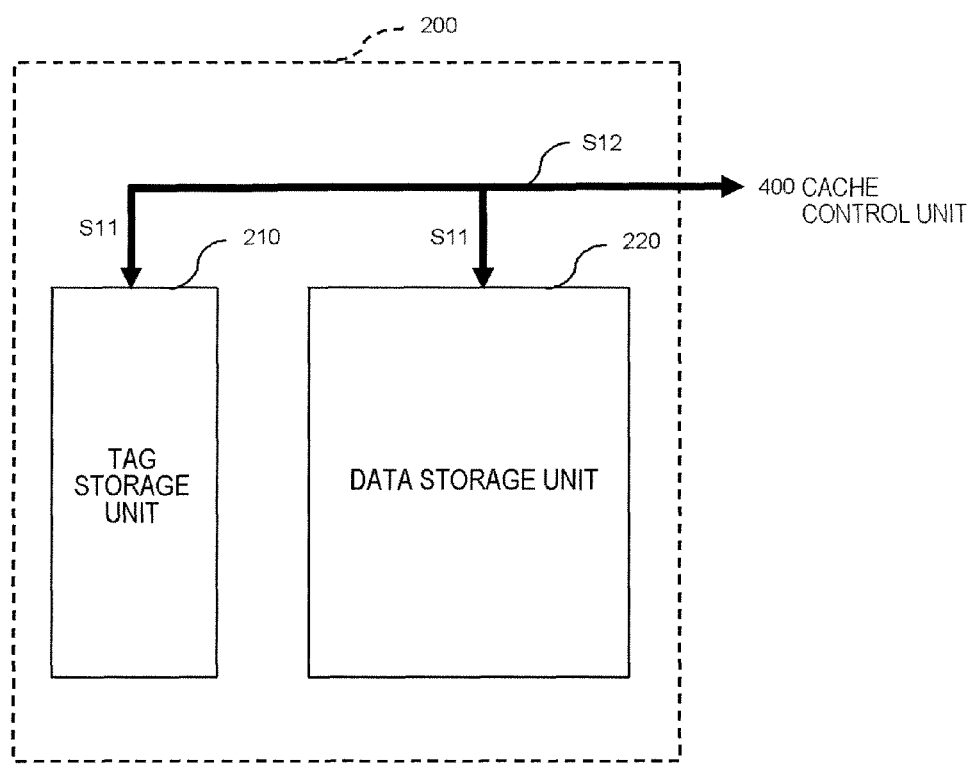
FIG. 9 is a drawing for explaining exemplary operations of the low-voltage operation enabling cache of this exemplary embodiment.

FIG. 9 is a drawing for explaining exemplary operations of the low-voltage operation enabling cache 200 of this exemplary embodiment. In the drawing, each symbol composed of the letter S and a numeral given beside each arrow represents the number of the step in which each operation takes place. Note that also the operations are same as those of the general cache, except for the source voltage.

In the step S11, the cache control unit 400 issues a check request for checking whether the data is stored in the low-voltage operation enabling cache 200, or a data storage request. Then in the step S12, the tag storage unit 210 and the data storage unit 220 return check result and data in response to the check request. On the other hand, they store a tag and data, in response to the data storage request.

Figure 11:
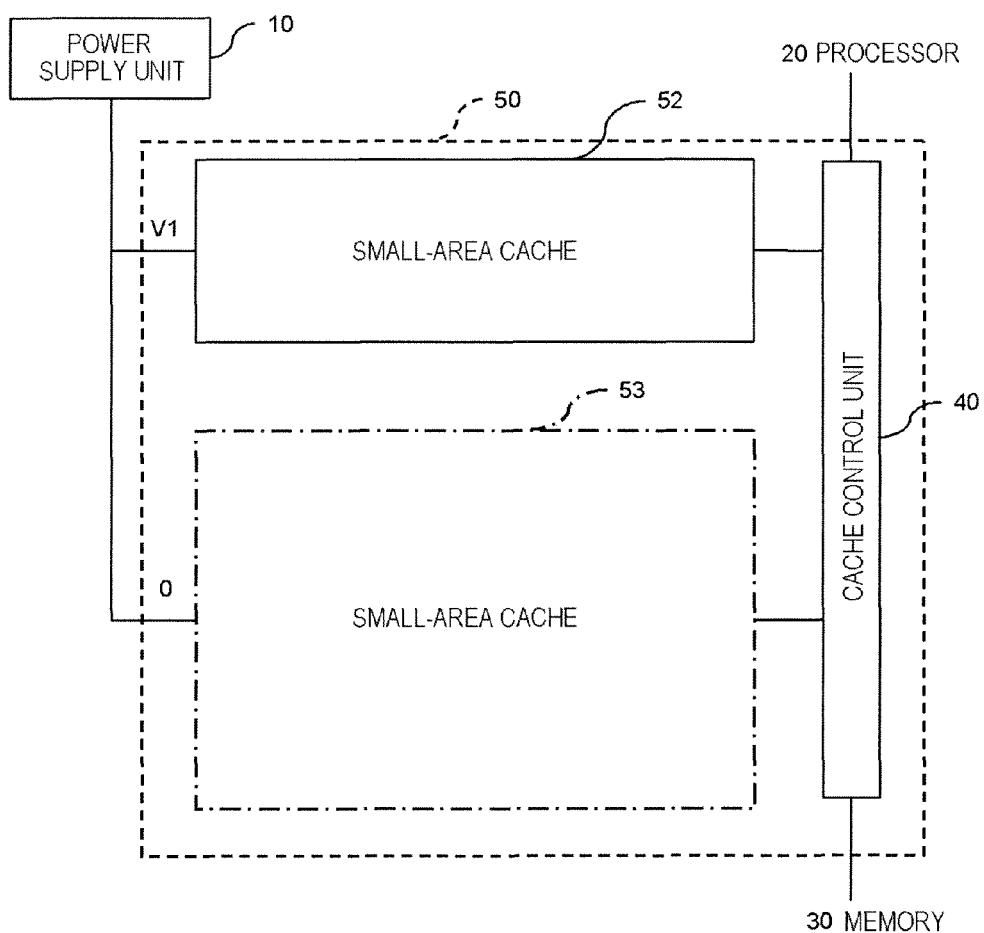
FIG. 11 is a block diagram illustrating a configuration of a system described in Patent Document.

As explained in the above, according to the semiconductor integrated circuit device of this exemplary embodiment, by using the low-voltage operation enabling cache 200, a low-power cache may be implemented by virtue of lowered voltage, while suppressing an area or overhead regarding delay. The effect of low power consumption may not be implemented neither by the technique of reducing the area of the same type of memories as described in Patent Document 1 illustrated in FIG. 11, nor by the combination of the reduction and the replacement of the reduced memory portion with different memory elements. The present invention is the first to implement the effect, only because the present inventors brought the low power consumption effected by the low voltage operation into focus.

While the exemplary embodiments dealt with the cache used by the processor, and explained the semiconductor integrated circuit device having the low-power cache and the method of controlling the same, the exemplary embodiments are adoptable to arbitrary devices and methods, without being limited to those described in the above.

The exemplary embodiments of the present invention were described referring to the attached drawings, merely for exemplary purposes, and allow various configurations other than those described in the above.

Figure 10:
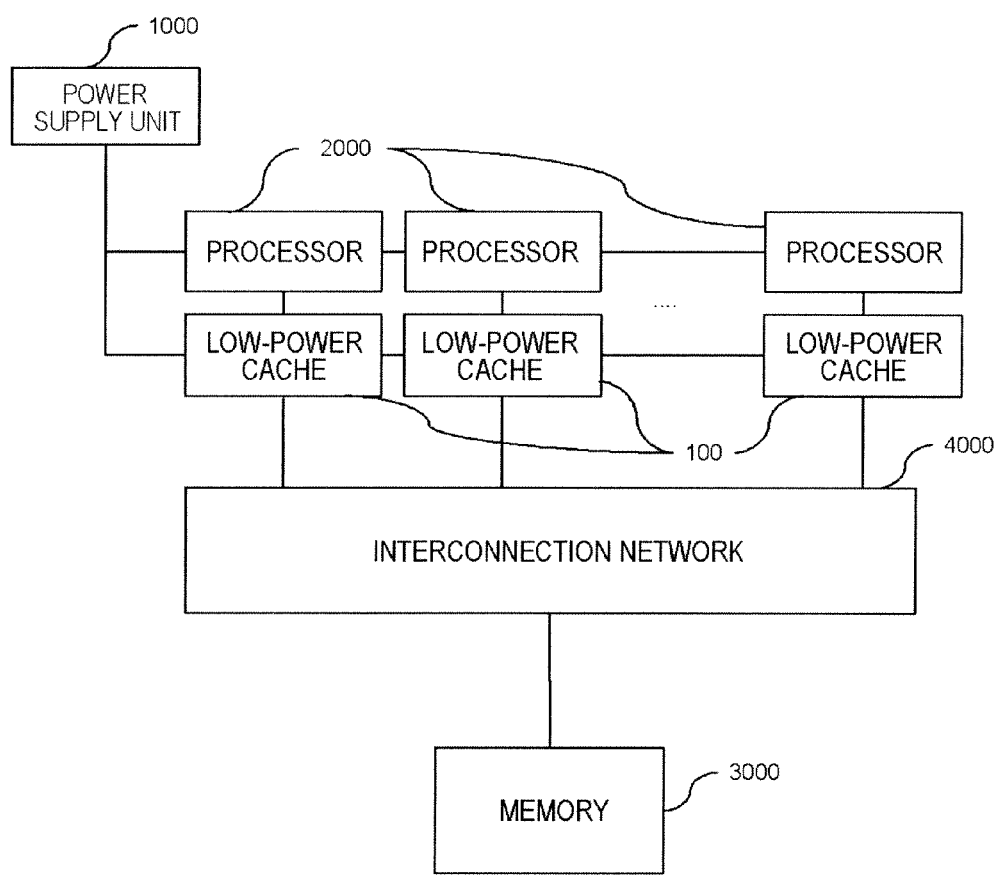
FIG. 10 is a block diagram illustrating a configuration of a semiconductor integrated circuit device which includes a plurality of low-power caches according to another exemplary embodiment of the present invention.

For example, in another exemplary embodiment of the present invention as illustrated in FIG. 10, a plurality of caches 100 may be included. As seen in the drawing, the device has a plurality of processors 2000, a plurality of caches 100 ("low-power cache 100" in the drawing), the memory 3000, an interconnection network 4000 for connecting the processors and the memory, and the power supply unit 1000.

A device having the plurality of processors 2000 generally save the power consumption, by lowering the clock frequency and source voltage, depending on the number of processors, while keeping the performances at a desirable level. The cache 100 of the present invention may achieve low power consumption also in this sort of device having a plurality of processors 2000.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese Patent Application No. 2009-203081 filed on Sep. 2, 2009, the disclosure of which is incorporated herein in its entirety by reference.

The invention claimed is:

1. A method of controlling a semiconductor integrated circuit device, said semiconductor integrated circuit device comprising a cache which includes a first storage device, and a second storage device having a type different from that of said first storage device, said cache being interposed between a processor and a memory and being connected to the processor and the memory, and said cache being configured to cache therein data of the memory, and said first storage device being configured to operate at a voltage below the lower limit voltage at which said second storage device is configured to operate, said method comprising:
supplying a first source voltage and a second source voltage independently to said first storage device and said second storage device, respectively, said first source voltage being lower than said second source voltage;
operating, by a control unit for controlling said semiconductor integrated circuit device, switchable controls between a first mode allowing only said first storage device of said cache to operate, and a second mode allowing said first storage device or said second storage device of said cache to operate;
operating, in said first mode, by a power supply unit, to the first source voltage which is set lower than the lower limit voltage at which said second storage device of said cache is configured to operate, to said first storage device of said cache, while, by said control unit, interrupting power supply to said second storage device of said cache from said power supply unit; and
said control unit, in said first mode, accessing said first storage device of cache in accordance with a request to access the data in the memory from the processor, and in said second mode, accessing at least one of said first storage device and said second storage device of said cache in accordance with the request to access the data in the memory from the processor.

2. The method of controlling a semiconductor integrated circuit device according to claim 1, wherein said first storage device and said second storage device of said cache are used by said processor which executes an application,
said method further comprising switching said first mode and said second mode, depending on an influence of degradation in performance caused by said cache at a time when said processor executes said application.

3. The method of controlling a semiconductor integrated circuit device according to claim 2, further comprising switching to said second mode, when said processor executes said application which is relatively largely influenced in its performance degrading caused by said cache.

4. The method of controlling a semiconductor integrated circuit device according to claim 2, further comprising switching to said first mode, when said processor executes said application which is relatively less influenced in its performance degradation caused by said cache.

5. The method of controlling a semiconductor integrated circuit device according to claim 3, further comprising switching to said first mode, when said processor executes said application which is relatively less influenced in its performance degradation caused by said cache.

6. The method of controlling a semiconductor integrated circuit device according to claim 1, further comprising switching to said second mode, when said processor executes an application which is relatively largely influenced in its performance degrading caused by said cache.

7. The method of controlling a semiconductor integrated circuit device according to claim 1, further comprising switching to said first mode, when said processor executes an application which is relatively less influenced in its performance degradation caused by said cache.

8. A semiconductor integrated circuit device, comprising:
a high-speed storage unit which includes a first storage device, and a second storage device having a type different from that of said first storage device, said high speed storage unit being interposed between a processor and a memory and being connected to the processor and the memory, and said high speed storage unit being configured to cache therein data of the memory;
a control unit which controls said first storage device and said second storage device; and
a power supply unit which supplies a first source voltage and a second source voltage independently to said first storage device and said second storage device, respectively, said first source voltage being lower than said second source voltage,
said first storage device being configured to operate at a voltage below the lower limit voltage at which said second storage device is configured to operate,
said control unit operating switchable controls between a first mode allowing only said first storage device of said high-speed storage unit to operate, and a second mode allowing said first storage device or said second storage device of said high-speed storage unit to operate,
said power supply unit, in said first mode, operating to supply the first source voltage which is set lower than the lower limit voltage at which said second storage device of said high-speed storage unit is operable, to said first storage device of said high-speed storage unit, while interrupting power supply to said second storage device of said high-speed storage unit, and
said control unit, in said first mode, accessing said first storage device of said high-speed storage unit in accordance with a request to access the data in the memory from the processor, and in said second mode, accessing at least one of said first storage device and said second storage device of said high-speed storage unit in accordance with the request to access the data in the memory from the processor.

9. The semiconductor integrated circuit device according to claim 8, wherein said first storage device and said second storage device of said high-speed storage unit are used by said processor which executes an application, and said control unit switches said first mode and said second mode, depending on an influence of degradation in performance caused by said high-speed storage unit at a time when said processor executes said application.

10. The semiconductor integrated circuit device according to claim 9, wherein said control unit switches to said second mode, when said processor executes said application which is relatively largely influenced in its performance degradation caused by said high-speed storage unit.

11. The semiconductor integrated circuit device according to claim 9, wherein said control unit switches to said first mode, when said processor executes said application which is relatively less influenced in its performance degradation caused by said high-speed storage unit.

12. The semiconductor integrated circuit device according to claim 8, wherein said first storage device of said high-speed storage unit comprises a circuit configured by a logic including a flip-flop, or a nonvolatile memory using a magnetism including an MRAM.

13. The semiconductor integrated circuit device according to claim 10, wherein said control unit switches to said first mode, when said processor executes said application which is relatively less influenced in its performance degradation caused by said high-speed storage unit.

14. The semiconductor integrated circuit device according to claim 9, wherein said first storage device of said high-speed storage unit comprises a circuit configured by a logic including a flip-flop, or a nonvolatile memory using a magnetism including an MRAM.

15. The semiconductor integrated circuit device according to claim 10, wherein said first storage device of said high-speed storage unit comprises a circuit configured by a logic including a flip-flop, or a nonvolatile memory using a magnetism including an MRAM.

16. The semiconductor integrated circuit device according to claim 11, wherein said first storage device of said high-speed storage unit comprises a circuit configured by a logic including a flip-flop, or a nonvolatile memory using a magnetism including an MRAM.

17. The semiconductor integrated circuit device according to claim 8, wherein said control unit switches to said second mode, when said processor executes an application which is relatively largely influenced in its performance degradation caused by said high-speed storage unit.

18. The semiconductor integrated circuit device according to claim 8, wherein said control unit switches to said first mode, when said processor executes an application which is relatively less influenced in its performance degradation caused by said high-speed storage unit.

19. A cache device, comprising:
a storage unit, comprising:
a first storage unit; and
a second storage unit having a type different from that of said first storage unit, said storage unit being interposed between a processor and a memory and being connected to the processor and the memory, and said storage unit being configured to cache therein data of the memory; and
a control unit which controls said first storage unit and said second storage unit,
said first storage unit and said second storage unit being independently supplied with a first source voltage and a second source voltage, respectively, said first source voltage being lower than said second source voltage,
said first storage unit being configured to operate at a voltage lower than the lower limit voltage at which said second storage unit is configured to operate,
said control unit operating switchable controls between a first mode allowing only said first storage unit to operate, and a second mode allowing said first storage unit or said second storage unit to operate,
said first storage unit, in said first mode, operating to supply the first source voltage which is set lower than the lower limit voltage at which said second storage unit is configured to operate, while interrupting power supply to said second storage unit, and said control unit, in said first mode, accessing said first storage device of said storage unit in accordance with a request to access the data in the memory from the processor, and in said second mode, accessing at least one of said first storage device and said second storage device of said storage unit in accordance with the request to access the data in the memory from the processor.

* * * * *